H. YOUNG.
Combined Crank and Wheel for Machinery.
No. 225,454. Patented Mar. 9, 1880.
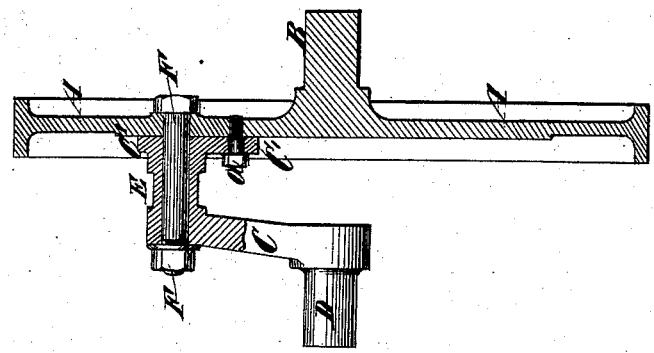
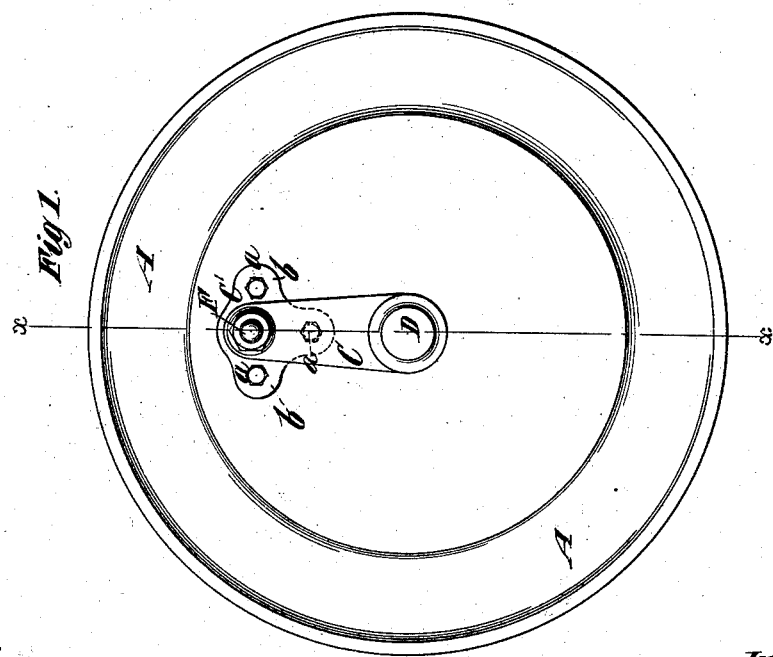

UNITED STATES PATENT OFFICE.

HUGH YOUNG, OF NEW YORK, N. Y.

COMBINED CRANK AND WHEEL FOR MACHINERY.

SPECIFICATION forming part of Letters Patent No. 225,454, dated March 9, 1880.

Application filed February 2, 1880.

*To all whom it may concern:*

Be it known that I, HUGH YOUNG, of the city of New York, in the county and State of New York, have invented a Combination of Crank and Wheel for Machinery, of which the following is a specification.

My invention is applicable to fly-wheels, to gear-wheels, or to other wheels embodied in machinery with which it is desired to combine a crank; and its object is to furnish a combination of crank and wheel which is very strong and of inexpensive construction.

My invention consists in the combination, with a drive-wheel or fly-wheel, of a crank having two arms or cheeks and a crank-pin or wrist made in one piece and secured to the wheel by having one of its arms or cheeks bolted to the face of the wheel.

In addition to bolts which pass through the cheek-piece for securing the crank to the wheel, I also preferably secure the crank by means of a bolt passing through the crank-pin or wrist and the wheel.

In the accompanying drawings, Figure 1 represents a face view of a combined wheel and crank embodying my invention, and Fig. 2 represents a section through the same in a plane passing through the supporting-journals.

Similar letters of reference designate corresponding parts in both figures.

A designates a wheel, which may be of any form—such, for instance, as a fly-wheel or gear-wheel. B designates a shaft-section, which constitutes one of the journals supporting said wheel, and which is represented as formed in one piece with the wheel. The section B may, however, consist of a separate shaft, and the wheel A be secured upon it in any suitable manner, as by keying it.

The crank is composed of two arms, cheeks, or sides, C C', one, C, of which is sufficiently long to support a journal, D, concentric with the journal B, and, together with it, constituting a support for the crank and wheel. The other cheek or side, C', may be in the form of a crank-arm like C, fitted for contact to the face of the wheel; or it might be in the form of a disk or of a plate made with rings *b b*, all being of suitable length, the essential feature being that it shall furnish a base sufficient to resist the strain exerted thereon by the work and weight between the journals B and D.

E designates the crank-pin or wrist uniting and made in the same piece with the arms, cheeks, or sides C C'.

The journal D may be made of one piece with the cheeks or sides C C' and crank-pin or wrist E by casting or forging; or the said journal may be made of a separate piece and secured in place by shrinking or otherwise.

Through the arm, cheek, or side C' extend bolts *a*, which secure the crank upon the face of the wheel A, and for greater security I employ a bolt, F, passing entirely through the center of the wrist or crank pin E and through the wheel A.

Before attaching the crank to the wheel I bore the latter or turn the shaft-section or journal B, attached thereto, and face the wheel perpendicular to the axis of the bore or of the shaft-section or journal B, and I bore the holes in the wheel for the bolts *a* and the bolt F parallel with the axis of the wheel. I then put the crank in the lathe, face the side, arm, or cheek C' that is to be placed upon the wheel, and turn the crank-pin or wrist perpendicular to said side or cheek. The surface of C' may, however, be first faced in a planer, and then secured on a lathe-chuck, on which the crank-pin or wrist E is turned. The crank and wheel are then bolted together, and the journal D turned in line with journal B.

A combined crank and wheel thus constructed and connected is very simple, easily and cheaply put together, and requires no keys, as the side or cheek C', bolted to the wheel, holds the crank firmly in position, thereby dispensing with the nice fitting required where cranks are shrunk on, and also the distortion produced by shrinking.

What I claim as my invention, and desire to secure by Letters Patent, is—

1. The combination, with a drive-wheel or fly-wheel, of a crank having two cheeks or arms and a crank-pin or wrist made in one piece, one of said cheeks or arms being bolted to the face of the wheel and the other having an attached journal, substantially as herein specified.

2. The crank composed of the two arms or cheeks C C′, crank-pin or wrist E, and attached journal D, in combination with the wheel A, to which said crank is bolted through the arm or cheek C′, substantially as herein specified.

3. The combination of the wheel A and its attached journal B, the crank C C′ E and its attached journal D, made in one piece, and the bolts F $a\ a$, all substantially as herein described.

HUGH YOUNG.

Witnesses:
FREDK. HAYNES,
E. P. JESSUP.